US011978332B2

United States Patent
Feng

(10) Patent No.: US 11,978,332 B2
(45) Date of Patent: May 7, 2024

(54) METHOD, SYSTEM AND DEVICE FOR VOICE PROMPTING, AND MOBILE CONTROL TERMINAL

(71) Applicant: AUTEL ROBOTICS CO., LTD., Guangdong (CN)

(72) Inventor: Yinhua Feng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 347 days.

(21) Appl. No.: 17/230,655

(22) Filed: Apr. 14, 2021

(65) Prior Publication Data
US 2021/0256834 A1    Aug. 19, 2021

Related U.S. Application Data

(63) Continuation of application No. PCT/CN2019/110144, filed on Oct. 9, 2019.

(30) Foreign Application Priority Data

Oct. 15, 2018  (CN) .......................... 201811197550.1

(51) Int. Cl.
   *G10L 13/08*  (2013.01)
   *G08B 21/24*  (2006.01)
   (Continued)

(52) U.S. Cl.
   CPC ............. *G08B 21/24* (2013.01); *G10L 13/02* (2013.01); *B64C 39/024* (2013.01); *B64U 10/13* (2023.01)

(58) Field of Classification Search
   CPC ......... G08B 21/24; G10L 13/02; G10L 13/00; B64C 39/024; B64U 10/13; B64U 2101/30; B64U 2201/20; B64U 50/19; G06F 3/167
   See application file for complete search history.

(56) References Cited

U.S. PATENT DOCUMENTS

| 2016/0379640 | A1  | 12/2016 | Joshi et al. |
| 2018/0109677 | A1* | 4/2018  | Liu ......................... G10L 13/08 |

(Continued)

FOREIGN PATENT DOCUMENTS

| CN | 101519980 A | 9/2009 |
| CN | 104867371 A | 8/2015 |

(Continued)

OTHER PUBLICATIONS

International Search Report dated Jan. 14, 2020; PCT/CN2019/110144.

(Continued)

*Primary Examiner* — Abul K Azad
(74) *Attorney, Agent, or Firm* — Frank Gao, Esq.

(57) ABSTRACT

The present invention relates to a method for voice prompting, a mobile control terminal and a system for voice prompting. The method includes: receiving, by the mobile control terminal, a warning instruction transmitted by an unmanned aerial vehicle (UAV); generating corresponding text information according to the warning instruction; converting the text information to an audio file; and playing the audio file. The mobile control terminal of the present invention provides various warning information to a user by playing an audio file, which is not a preset audio file directly stored in the mobile control terminal, but an audio file converted from text information generated by the mobile control terminal according to a warning instruction transmitted by the UAV. Therefore, there is no need to store a preset audio file in the mobile control terminal, which reduces a memory space occupied in the mobile control terminal and improves performance of the mobile control terminal.

15 Claims, 5 Drawing Sheets

(51) Int. Cl.
  *G10L 13/02* (2013.01)
  *B64C 39/02* (2023.01)
  *B64U 10/13* (2023.01)

(56) References Cited

U.S. PATENT DOCUMENTS

| | | | | |
|---|---|---|---|---|
| 2018/0286383 | A1* | 10/2018 | Barari | G10L 13/033 |
| 2018/0292531 | A1* | 10/2018 | Xie | G01S 15/08 |
| 2018/0292844 | A1 | 10/2018 | Kosseifi et al. | |
| 2020/0193729 | A1* | 6/2020 | Nilsson | B64F 5/60 |

FOREIGN PATENT DOCUMENTS

| | | | | |
|---|---|---|---|---|
| CN | 105405258 A | * | 3/2016 | G08B 25/10 |
| CN | 205304803 U | | 6/2016 | |
| CN | 105793792 A | | 7/2016 | |
| CN | 106483973 A | | 3/2017 | |
| CN | 106716278 A | | 5/2017 | |
| CN | 108170156 A | | 6/2018 | |
| CN | 108492826 A | | 9/2018 | |
| CN | 108648509 A | | 10/2018 | |
| CN | 109377734 A | | 2/2019 | |
| EP | 3109857 A1 | | 12/2016 | |
| KR | 2018000767 A | * | 1/2018 | B64C 39/024 |
| WO | 2009081455 A1 | | 7/2009 | |
| WO | 2018039981 A1 | | 3/2018 | |

OTHER PUBLICATIONS

The First Chinese Office Action dated Mar. 26, 2020; Appln. No. 201811197550.1.

The Third Chinese Office Action dated Mar. 17, 2021; Appln. No. 201811197550.1.

* cited by examiner

METHOD, SYSTEM AND DEVICE FOR VOICE PROMPTING, AND MOBILE CONTROL TERMINAL

CROSS-REFERENCE

This application is a continuation application of International Application No. PCT/CN2019/110144, filed on Oct. 9, 2019, which claims priority of Chinese Patent Application No. 2018111975501, filed on Oct. 15, 2018, which is incorporated herein by reference in its entirely.

BACKGROUND

Technical Field

The present invention relates to the field of aircraft, and in particular, to a method and system for voice prompting, a mobile control terminal and a device for voice prompting.

Related Art

In recent years, as a new type of vehicle, an aircraft such as an unmanned aerial vehicle (UAV for short) is applicable to various fields, such as aerial photography, agriculture, plant protection, mini-selfie, express transportation, disaster relief and the like.

During control of the aircraft through a remote control by a user, the aircraft may provide various warning information to feed back a current flight condition or a current flight environment of the aircraft back to the user in real time, for example, transmit prompt information to notify the user that a flying altitude of the aircraft is excessively high/excessively low, that a flying distance of the aircraft exceeds a maximum flying distance thereof, that the aircraft is close to a no-fly area or a restricted area of an airport, or the like. At present, most prompt information is provided to the user in a form of text information. The text information is usually displayed on a terminal device, for example, scrollably displayed on a display screen connected to the remote control, and is generally displayed for fewer than 3 seconds. When busy operating the aircraft, the user is likely to ignore the text information displayed on the terminal device. Another type of warning information is provided to the user in a form of voice information. The voice information is directly played to the user through the terminal device, so that the user can learn the current flight condition or the current flight environment of the aircraft without needing to constantly pay attention to the text information on the display screen of the terminal device.

During implementation of the present invention, the inventor finds at least the following problems in the related art. All of the warning information currently provided to users in the form of voice information is preset audio files. The audio files are directly stored in a mobile control terminal. When receiving an instruction from the aircraft, the terminal device retrieves and plays a corresponding audio file to notify the user of relevant information. In this way, the mobile control terminal needs to store a relatively large number of audio files, which occupy a relatively large memory space.

SUMMARY

Embodiments of the present invention provide a method for voice prompting, a system for voice prompting, a mobile control terminal and a device for voice prompting, to resolve a problem that a relatively large memory space is occupied since a mobile control terminal needs to store a relatively large number of audio files in the solution of directly storing audio files in the mobile control terminal and retrieving and playing required audio files when necessary in the prior art.

In order to resolve the above technical problem, an embodiment of the present invention provides a method for voice prompting applicable to a mobile control terminal. The method includes:

receiving a warning instruction transmitted by an unmanned aerial vehicle (UAV);

generating corresponding text information according to the warning instruction;

converting the text information to an audio file; and playing the audio file.

In some embodiments, the converting the text information to an audio file includes:

invoking a text-to-audio library built in the mobile control terminal; and converting the text information to a corresponding audio file by using the invoked text-to-audio library.

In some embodiments, the UAV transmits the warning instruction to the mobile control terminal according to a current flight condition or a current flight environment of the UAV and a predetermined protocol.

In some embodiments, the method further includes: releasing the warning instruction after the playing of the audio file.

In some embodiments, the mobile control terminal is a remote control.

In order to resolve the above technical problem, an embodiment of the present invention further provides a method for voice prompting. The method includes:

transmitting, by a UAV, a warning instruction to a mobile control terminal;

receiving, by the mobile control terminal, the warning instruction transmitted by the UAV;

generating, by the mobile control terminal, corresponding text information according to the warning instruction;

converting, by the mobile control terminal, the text information to an audio file; and playing, by the mobile control terminal, the audio file.

In some embodiments, the converting, by the mobile control terminal, the text information to an audio file includes:

invoking, by the mobile control terminal, a text-to-audio library built in the mobile control terminal; and converting the text information to a corresponding audio file by using the invoked text-to-audio library.

In some embodiments, the transmitting, by a UAV, a warning instruction to a mobile control terminal includes:

transmitting, by the UAV, the warning instruction to the mobile control terminal according to a current flight condition or a current flight environment of the UAV and a predetermined protocol.

In some embodiments, the method further includes: releasing, by the mobile control terminal, the warning instruction after the mobile control terminal plays the audio file.

In some embodiments, the mobile control terminal is a remote control.

In order to resolve the above technical problem, an embodiment of the present invention further provides a mobile control terminal, including:

a warning instruction receiving module configured to receive a warning instruction transmitted by a UAV and transmit the warning instruction to a text information generating module;

the text information generating module configured to receive the warning instruction, generate corresponding text information according to the warning instruction and transmit the text information to an audio file conversion module;

the audio file conversion module configured to receive the text information, convert the text information to an audio file and transmit the audio file to an audio file playback module; and the audio file playback module configured to receive the audio file and play the audio file.

In some embodiments, the audio file conversion module is specifically configured to:

invoke a text-to-audio library built in the mobile control terminal; and convert the text information to a corresponding audio file by using the invoked text-to-audio library.

In some embodiments, the warning instruction transmitted by the UAV is transmitted by the UAV to the mobile control terminal according to a current flight condition or a current flight environment of the UAV and a predetermined protocol.

In some embodiments, the mobile control terminal further includes a release module configured to release the warning instruction after the audio file playback module plays the audio file.

In some embodiments, the mobile control terminal is a remote control.

In order to resolve the above technical problem, an embodiment of the present invention further provides a system for voice prompting, including: a UAV and a mobile control terminal in wireless communication with the UAV, where the UAV is configured to transmit a warning instruction to the mobile control terminal; and the mobile control terminal is configured to receive the warning instruction transmitted by the UAV, generate corresponding text information according to the warning instruction, convert the text information to an audio file and play the audio file.

In some embodiments, the mobile control terminal includes a warning instruction receiving module, a text information generating module, an audio file conversion module and an audio file playback module.

The warning instruction receiving module is configured to receive the warning instruction transmitted by the UAV and transmit the warning instruction to the text information generating module.

The text information generating module is configured to receive the warning instruction, generate the corresponding text information according to the warning instruction and transmit the text information to the audio file conversion module.

The audio file conversion module is configured to receive the text information, convert the text information to the audio file and transmit the audio file to the audio file playback module.

The audio file playback module is configured to receive the audio file and play the audio file.

In some embodiments, the audio file conversion module is specifically configured to:

invoke a text-to-audio library built in the mobile control terminal; and convert the text information to a corresponding audio file by using the invoked text-to-audio library.

In some embodiments, the warning instruction transmitted by the UAV is transmitted by the UAV to the mobile control terminal according to a current flight condition or a current flight environment of the UAV and a predetermined protocol.

In some embodiments, the mobile control terminal further includes a release module configured to release the warning instruction after the mobile control terminal plays the audio file.

In some embodiments, the mobile control terminal is a remote control.

In order to resolve the above technical problem, an embodiment of the present invention further provides a mobile control terminal, including a processor and a memory communicatively connected to the processor.

The memory stores an instruction program executable by the processor, and the instruction program, when executed by the processor, causes the processor to perform the method for voice prompting described above.

In order to resolve the above technical problem, an embodiment of the present invention further provides a device for voice prompting, including a processor and a memory communicatively connected to the processor.

The memory stores an instruction program executable by the processor, and the instruction program, when executed by the processor, causes the processor to perform the method for voice prompting described above.

In the technical solutions of the embodiments of the present invention, the mobile control terminal provides various warning information to a user by playing an audio file, which is not a preset audio file directly stored in the mobile control terminal, but an audio file converted from text information generated by the mobile control terminal according to a warning instruction transmitted by the UAV. Therefore, there is no need to store a preset audio file in the mobile control terminal, which reduces a memory space occupied in the mobile control terminal and improves performance of the mobile control terminal.

BRIEF DESCRIPTION OF THE DRAWINGS

To describe the technical solutions of the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

Figure 1:
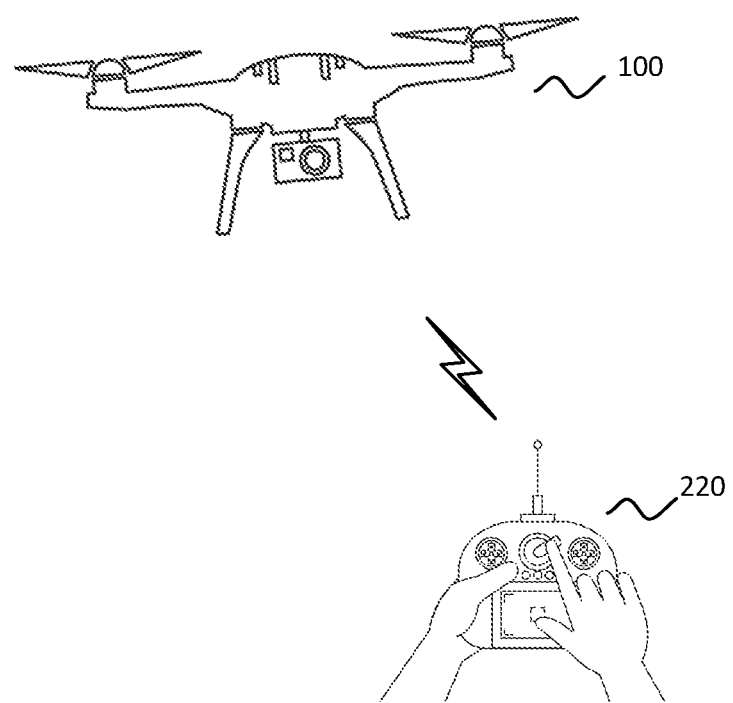
FIG. 1 is a schematic diagram of a system for voice prompting according to an embodiment of the present invention.
Figure 2:
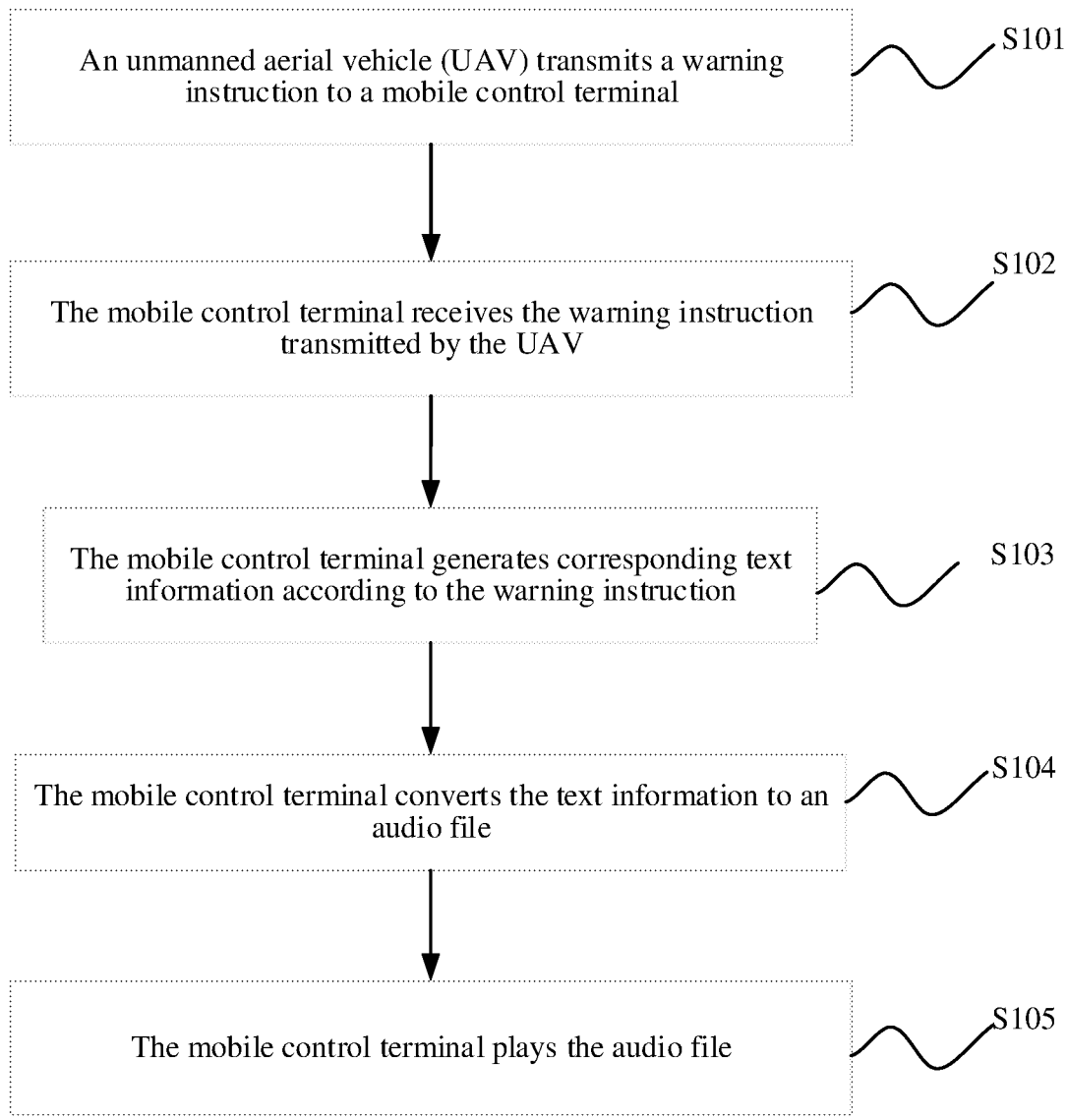
FIG. 2 is a schematic diagram of an operation process of a method for voice prompting according to an embodiment of the present invention.
Figure 3:
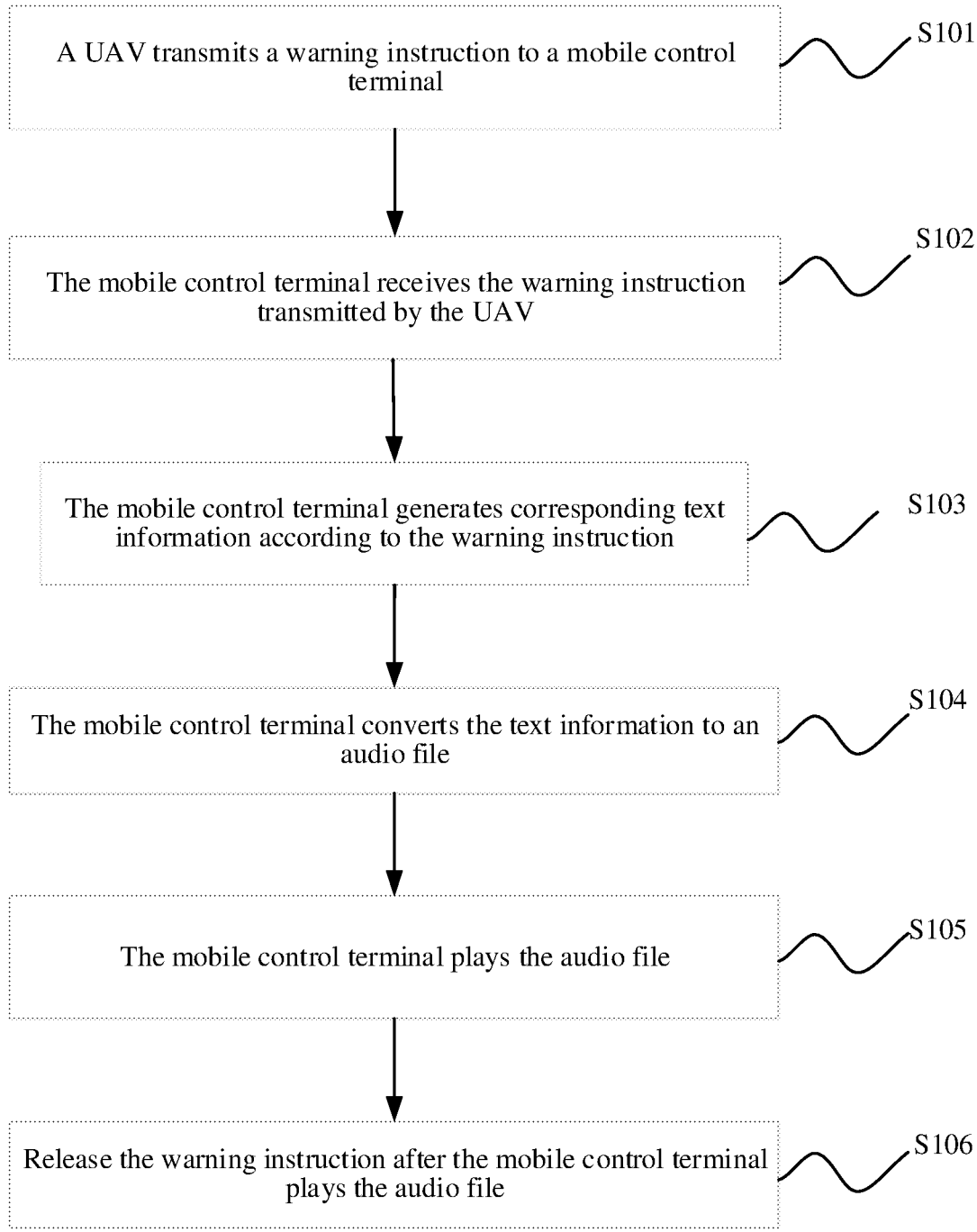
FIG. 3 is a schematic diagram of an operation flow of a method for voice prompting according to another embodiment of the present invention.
Figure 4:
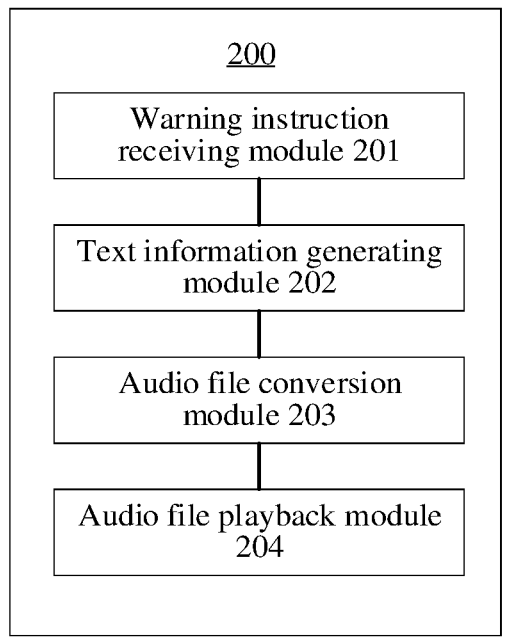
FIG. 4 is a schematic diagram of modules of a mobile control terminal according to an embodiment of the present invention.
Figure 5:
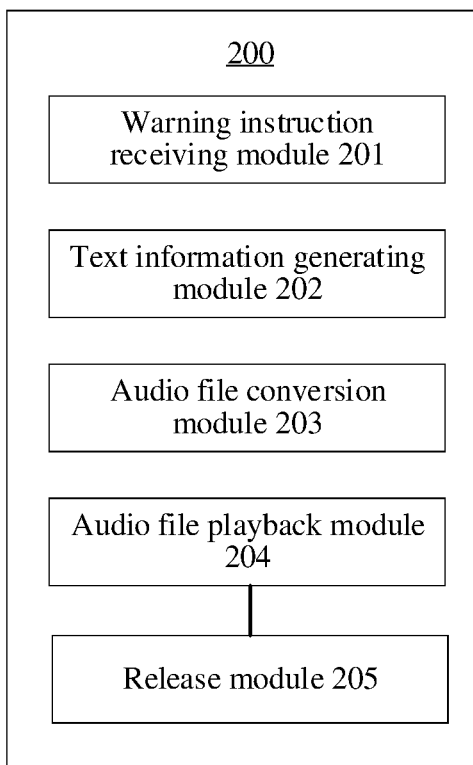
FIG. 5 is a schematic diagram of modules of a mobile control terminal according to another embodiment of the present invention.
Figure 6:
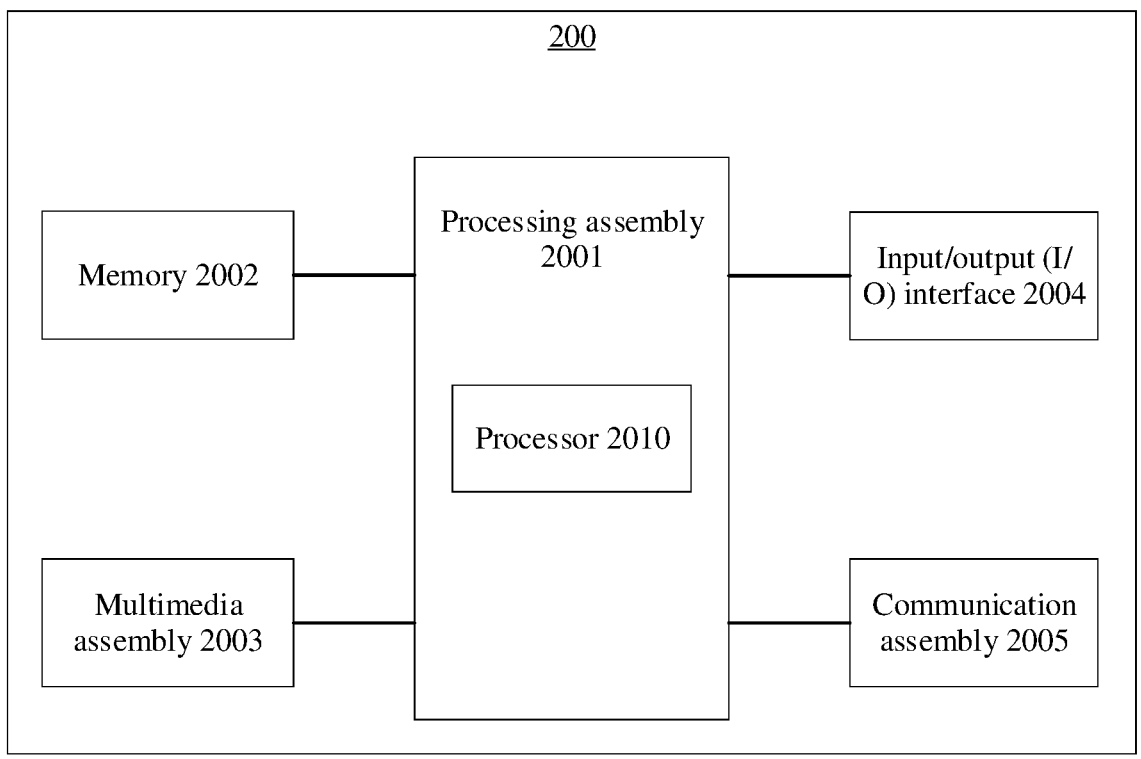
FIG. 6 is a block diagram of a mobile control terminal according to an embodiment of the present invention.

Referring to FIG. 1 to FIG. 6, FIG. 1 is a schematic diagram of a system for voice prompting according to an embodiment of the present invention; FIG. 2 is a schematic diagram of an operation process of a method for voice prompting according to an embodiment of the present invention. FIG. 3 is a schematic diagram of an operation flow of a method for voice prompting according to another embodiment of the present invention. FIG. 4 is a schematic diagram of modules of a mobile control terminal according to an embodiment of the present invention; FIG. 5 is a schematic diagram of modules of a mobile control terminal according to another embodiment of the present invention; and FIG. 6 is a block diagram of a mobile control terminal according to an embodiment of the present invention.

As shown in FIG. 1, a system 300 for voice prompting provided in the embodiment of the present invention includes a UAV 100 and a mobile control terminal 200 in wireless communication with the UAV 100. Specifically, the mobile control terminal 200 may be a remote control equipped with a display apparatus. A wireless communication connection is established between the UAV 100 and the mobile control terminal 200. The UAV 100 and the mobile control terminal 200 can transmit data therebetween through wireless communication. The mobile control terminal 200 transmits a control signal of the remote control to the UAV 100 to remotely control flight and photographing of the UAV 100.

Specifically, in the embodiment of the present invention, the UAV 100 and the mobile control terminal 200 have modules for data transmission therebetween, for example, a radio frequency module (an RF module). The UAV 100 transmits, to the radio frequency module of the mobile control terminal 200 through the radio frequency module of the UAV, data of the UAV such as image data captured by an image capturing apparatus of the UAV and data representing a flight condition or a flight environment outputted by a flight control module and the like, and then relevant data information is transferred to a user through a multimedia assembly on the mobile control terminal 200, for example, displayed to the user through a display apparatus or played to the user through an audio playback apparatus. In addition, when the user inputs, through the mobile control terminal 200, a flight instruction for operating flight of the UAV 100 or a photographing request for photographing an image, the mobile control terminal 200 generates a corresponding control instruction based on the flight instruction or the photographing request, and the control instruction is transmitted by the radio frequency module of the mobile control terminal 200 to the radio frequency module of the UAV 100. Upon receipt of the control instruction, the radio frequency module of the UAV 100 transmits the control instruction to a processor of the UAV 100, and the processor completes a corresponding task.

Specifically, in the embodiment of the present invention, the UAV 100 is configured to transmit a warning instruction to the mobile control terminal 200.

The mobile control terminal 200 is configured to receive the warning instruction transmitted by the UAV 100, generate corresponding text information according to the warning instruction, convert the text information to an audio file and play the audio file for a user.

FIG. 2 is an operation flowchart of a method for voice prompting according to an embodiment of the present invention. The method may be applicable to the system for voice prompting shown in FIG. 1. The method specifically includes the following steps.

Step S101: A UAV 100 transmits a warning instruction to a mobile control terminal 200.

During flight of the UAV 100, a flight control module of the UAV detects a flight condition or a flight environment of the UAV 100 in real time. When the UAV 100 encounters an emergency and needs to notify a user of the emergency, for example, when the UAV 100 flies near an airport and is about to approach or has entered a no-fly area or a restricted area of the airport, or when a battery of the UAV 100 is about to run out and in a low battery state and cannot support a next flight mission, or when an obstacle appears in front of the UAV 100, the UAV 100 needs to timely feed back the emergencies to the user that is operating the UAV 100 at the mobile control terminal 200 (that is, at the remote control side), so that the user timely performs corresponding operations, for example, suspends or ends the flight mission. For the emergencies, the flight control module of the UAV 100 transmits corresponding warning instructions to the mobile control terminal 200 according to the current flight condition or the current flight environment of the UAV 100 and a predetermined protocol.

Step S102: The mobile control terminal 200 receives the warning instruction transmitted by the UAV 100. Step S103: The mobile control terminal 200 generates corresponding text information according to the warning instruction.

Upon receipt of the warning instruction transmitted by the UAV 100, the mobile control terminal 200 generates the corresponding text information according to the warning instruction. For example, when the UAV 100 flies near the airport and is about to approach or has entered the no-fly area or the restricted area of the airport, the text information may be prompt information such as "The aircraft is about to enter the no-fly area of the airport, please re-select a flight path", "The aircraft is about to enter the restricted area of the airport, please stop flying immediately" or the like. For another example, when the battery of the UAV 100 is about to be used up and in a low battery state, the text information may be "The current battery level is less than 10%, please stop flying", "The current battery level is low, please return immediately", "The current battery level is low, please replace the battery in time", or the like. For another example, when an obstacle appears in front of the UAV 100, the text prompting information may be "Obstacles ahead, please stop flying", "Obstacles ahead, please go around", "Obstacles ahead, please pay attention", or the like. The text information may be pre-stored in the mobile control terminal 200 and may be in a one-to-one correspondence with various warning instructions transmitted by the UAV 100.

Step S104: The mobile control terminal 200 converts the text information to an audio file.

Specifically, a text-to-audio library may be built in the mobile control terminal 200 in advance for conversion of texts to an audio. After generating the text information corresponding to the warning instruction, the mobile control terminal 200 may convert the text information to a corresponding audio file by invoking the text-to-audio library built in the mobile control terminal. Content of the converted audio file may be the same as or similar to content of the text information.

Step S105: The mobile control terminal 200 plays the audio file.

After the text information is converted to the audio file, the mobile control terminal 200 plays the audio file to provide the warning information to a user. Since the warning information is played to the user in a form of an audio file, the user can learn the current flight condition or the current flight environment of the UAV 100 without needing to constantly pay attention to the content displayed on a display of the mobile control terminal 200, so that the user can be more concentrated on operating the UAV 100, and is unlikely to miss each piece of the warning information.

Compared with the prior art in which audio files are directly stored in the mobile control terminal 200, in the embodiments of the present invention, the mobile control terminal 200 stores the text-to-audio library for converting text information to an audio file, and a memory space occupied by the text-to-audio library is much less than that occupied by the audio files, so that the memory space occupied in the mobile control terminal 200 can be significantly reduced and performance of the mobile control terminal 200 can be improved.

As shown in FIG. 3, in some embodiments of the present invention, after step S105, the method further includes step S106: release the warning instruction after the mobile control terminal 200 plays the audio file.

The audio file played by the mobile control terminal 200 is obtained by converting the text information generated from the warning instruction transmitted by the UAV 100. Therefore, in order to avoid occupying an excessive memory space of the mobile control terminal 200, after the audio file is played, the warning instruction as a source file may be cleaned, deleted, or the like, and the warning instruction is released, thereby releasing the space that is originally occupied by the warning instruction in the mobile control terminal 200.

In the system 300 for voice prompting provided in the embodiments of the present invention, the mobile control terminal 200 generates corresponding text information according to the warning instruction upon receipt of the warning instruction transmitted by the UAV 100 and converts the text information to an audio file, thereby playing the audio file converted from the text information. Therefore, there is no need to store a preset audio file in the mobile control terminal 200, so that the memory space occupied in the mobile control terminal 200 can be reduced and the performance of the mobile control terminal 200 can be improved, thereby improving performance of the entire system 300 for voice prompting.

FIG. 4 is a schematic diagram of modules of a mobile control terminal 200 according to an exemplary embodiment of the present invention. The mobile control terminal may be, for example, the mobile control terminal in the system for voice prompting shown in FIG. 1.

Referring to FIG. 4, the mobile control terminal 200 includes a warning instruction receiving module 201 configured to receive a warning instruction transmitted by a UAV and transmit the warning instruction to a text information generating module; the text information generating module 202 configured to receive the warning instruction, generate corresponding text information according to the warning instruction and transmit the text information to an audio file conversion module; the audio file conversion module 203 configured to receive the text information, convert the text information to an audio file and transmit the audio file to an audio file playback module; and the audio file playback module 204 configured to receive the audio file and play the audio file. The warning instruction receiving module 201, the text information generating module 202, the audio file conversion module 203 and the audio file playback module 204 have the same principles as those in the method embodiment described in combination with FIG. 2 and FIG. 3, which are not described again.

In the mobile control terminal 200 provided in the embodiments of the present invention, the mobile control terminal 200 generates corresponding text information according to the warning instruction upon receipt of the warning instruction transmitted by the UAV 100 and converts the text information to an audio file, thereby playing the audio file converted from the text information. Therefore, there is no need to store a preset audio file in the mobile control terminal 200, so that a memory space occupied in the mobile control terminal 200 can be reduced and performance of the mobile control terminal 200 can be improved, thereby improving performance of the entire system 300 for voice prompting.

In some embodiments, as shown in FIG. 5, the mobile control terminal 200 further includes a release module 205 configured to release the warning instruction after the audio file playback module 204 receives and plays the audio file.

The audio file played by the mobile control terminal 200 is obtained by converting the text information generated from the warning instruction transmitted by the UAV 100. Therefore, in order to avoid occupying an excessive memory space of the mobile control terminal 200, after the audio file is played, the warning instruction as a source file may be cleaned, deleted, or the like, and the warning instruction is released, thereby releasing the space that is originally occupied by the warning instruction in the mobile control terminal 200.

In some embodiments, the warning instruction receiving module 201 is configured to enable the mobile control terminal 200 and the UAV 100 to perform wireless transfer of control information. The wireless manner may be radio frequency transmission, infrared transmission, Bluetooth transmission, Wi-Fi transmission, or the like. The audio file playback module 204 may be a speaker. Certainly, the speaker is merely an embodiment of the present invention, and the audio file playback module 204 may also be other devices that can play audio files.

FIG. 6 is a block diagram of a mobile control terminal according to an embodiment of the present invention. The mobile control terminal 200 may include one or more of the following assemblies: a processing assembly 2001, a memory 2002, a multimedia assembly 2003, an input/output (I/O) interface 2004 and a communication assembly 2005.

The processing assembly 2001 controls overall operations of the mobile control terminal 200, for example, operations associated with display, data communication, photographing operations, control of flight of the UAV 100 and the like. The processing assembly 2001 may include one or more processors 2010 configured to execute instructions to complete all or some of the steps of the method on the mobile control terminal side in the above embodiments.

The memory 2002 is configured to store various types of data supporting operations on the mobile control terminal 200, for example, instructions, contact data, messages, pictures, videos, files and the like of any application or method operated on the mobile control terminal 200. The memory 2002 can be implemented by any type of volatile or non-volatile storage devices or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The multimedia assembly 2003 includes an audio apparatus that provides an output interface between the mobile control terminal 200 and a user, for example, a speaker for playing an audio. The multimedia assembly 2003 may further be a display apparatus that provides an output interface between the mobile control terminal 200 and the user. In some embodiments, the display apparatus may include a liquid crystal display (LCD) and/or a touch panel (TP). If the screen includes the touch panel, the screen may be implemented as a touchscreen to receive an input signal from the user.

The input/output (I/O) interface 2004 provides an interface between the processing assembly 2001 and a peripheral interface module. The peripheral interface module may be a keyboard, a button, a virtual key or the like, for example, a Home button, a volume button, and a lock screen button on a smart phone.

The communication assembly 2005 is configured to perform wired or wireless communication between the mobile control terminal 200 and other devices. The mobile control terminal 200 may be connected to a wireless network based on a communication standard, such as a Wi-Fi network, a 3G network or a 4G network. In some embodiments, the communication assembly 2005 further includes a near field communication (NFC) module for short-range communication. For example, the NFC module may be implemented based on technologies such as a radio frequency identification (RFID) technology, an infrared communication (IrDA) technology, an ultra-wideband (UWB) technology, a Bluetooth (BT) technology or the like.

In the embodiments of the present invention, the mobile control terminal 200 may be implemented by one or more of electronic elements such as an application-specific integrated circuit (ASIC), a digital signal processor (DSP), a digital signal processing device (DSro), a programmable logic device (PLD), a field-programmable gate array (FPGA), a controller, a microcontroller, a microprocessor, or the like to implement the above method on the display terminal side.

An embodiment of the present invention further provides a non-volatile computer-readable storage medium, for example, the memory 2002. The non-volatile computer-readable storage medium stores computer-executable instructions. The computer-executable instructions are executed by the processor 2010 of the mobile control terminal 200 to complete the photographing method in any method embodiment on the display terminal side, for example, to perform some or all of the steps in the method of FIG. 2 to FIG. 3 to implement the functions of the modules in FIG. 4 to FIG. 5. The non-volatile computer-readable storage medium may be a read-only memory (ROM), a random access memory (RAM), a CD-ROM, a magnetic tape, a floppy disk, or an optical data storage device.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

Finally, it should also be noted that the foregoing embodiments are merely intended for describing the technical solutions of the present invention rather than limiting the present invention. Under the ideas of the present invention, the technical features in the foregoing embodiments or different embodiments may also be combined, the steps may be performed in any order, many other changes of different aspects of the present invention also exist as described above, and these changes are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the scope of the technical solutions of the embodiments of the present invention.

What is claimed is:

1. A method for voice prompting applicable to a mobile control terminal, wherein the method comprises:
receiving a warning instruction transmitted by an unmanned aerial vehicle;
generating corresponding text information according to the warning instruction;
converting the text information to an audio file; and
playing the audio file;
releasing the warning instruction after the playing of the audio file;
wherein the warning instruction is transmitted by the unmanned aerial vehicle to the mobile control terminal according to a current flight condition or a current flight environment of the unmanned aerial vehicle and a predetermined protocol.

2. The method according to claim 1, wherein the converting the text information to an audio file comprises:
invoking a text-to-audio library built in the mobile control terminal; and
converting the text information to a corresponding audio file by using the invoked text-to-audio library.

3. The method according to claim 1, wherein the mobile control terminal is a remote control.

4. A mobile control terminal, comprising: a processor and a memory communicatively connected to the processor, wherein
the memory stores an instruction program executable by the processor, and the instruction program, when executed by the processor, causes the processor to perform the method for voice prompting according to claim 1.

5. A method for voice prompting, comprising:
transmitting, by an unmanned aerial vehicle, a warning instruction to a mobile control terminal;
receiving, by the mobile control terminal, the warning instruction transmitted by the unmanned aerial vehicle;
generating, by the mobile control terminal, corresponding text information according to the warning instruction;
converting, by the mobile control terminal, the text information to an audio file; and
playing, by the mobile control terminal, the audio file;
wherein the transmitting, by the unmanned aerial vehicle, a warning instruction to a mobile control terminal comprises:
transmitting, by the unmanned aerial vehicle, the warning instruction to the mobile control terminal according to a current flight condition or a current flight environment of the unmanned aerial vehicle and a predetermined protocol;
releasing, by the mobile control terminal, the warning instruction after the mobile control terminal plays the audio file.

6. The method according to claim 5, wherein the converting, by the mobile control terminal, the text information to an audio file comprises:
invoking, by the mobile control terminal, a text-to-audio library built in the mobile control terminal; and
converting the text information to a corresponding audio file by using the invoked text-to-audio library.

7. The method according to claim 5, wherein the mobile control terminal is a remote control.

8. A device for voice prompting, comprising: a processor and a memory communicatively connected to the processor, wherein
the memory stores an instruction program executable by the processor, and the instruction program, when executed by the processor, causes the processor to perform the method for voice prompting according to claim 5.

9. A mobile control terminal comprising:
a processor configured to:
receive a warning instruction transmitted by an unmanned aerial vehicle and transmit the warning instruction to a text information generating module;
receive the warning instruction, generate corresponding text information according to the warning instruction and transmit the text information to an audio file conversion module;
receive the text information, convert the text information to an audio file and transmit the audio file to an audio file playback module; and
the audio file playback module configured to receive the audio file and play the audio file;
the warning instruction transmitted by the unmanned aerial vehicle is transmitted by the unmanned aerial vehicle to the mobile control terminal according to a current flight condition or a current flight environment of the unmanned aerial vehicle and a predetermined protocol;
release the warning instruction after the audio file playback module plays the audio file.

10. The mobile control terminal according to claim 9, wherein the processor is further configured to:
invoke a text-to-audio library built in the mobile control terminal; and
convert the text information to a corresponding audio file by using the invoked text-to-audio library.

11. The mobile control terminal according to claim 9, wherein the mobile control terminal is a remote control.

12. A device for voice prompting, comprising:
an unmanned aerial vehicle;
a mobile control terminal in wireless communication with the unmanned aerial vehicle;
a processor coupled to the unmanned aerial vehicle and configured to transmit a warning instruction to the mobile control terminal; and
a processor coupled to the mobile control terminal configured to:
receive the warning instruction transmitted by the unmanned aerial vehicle;
generate corresponding text information according to the warning instruction, convert the text information to an audio file and play the audio file;
wherein the warning instruction transmitted by the unmanned aerial vehicle is transmitted by the unmanned aerial vehicle to the mobile control terminal according to a current flight condition or a current flight environment of the unmanned aerial vehicle and a predetermined protocol;
release the warning instruction after the mobile control terminal plays the audio file.

13. The device for voice prompting according to claim 12, wherein the processor coupled to the mobile control terminal is further configured to:
receive the warning instruction transmitted by the unmanned aerial vehicle and transmit the warning instruction to the text information generating module;
receive the text information, convert the text information to the audio file and transmit the audio file to the audio file playback module; and
receive the audio file and play the audio file.

14. The device for voice prompting according to claim 13, wherein the processor coupled to the mobile control terminal is further configured to:
invoke a text-to-audio library built in the mobile control terminal; and
convert the text information to a corresponding audio file by using the invoked text-to-audio library.

15. The device for voice prompting according to claim 12, wherein the mobile control terminal is a remote control.

* * * * *